(12) United States Patent
Dumur et al.

(10) Patent No.: US 10,748,441 B2
(45) Date of Patent: *Aug. 18, 2020

(54) METHOD OF DRIVING A MAIN ROTOR OF A ROTORCRAFT IN THE CONTEXT OF SIMULATING A FAILURE OF ONE OF THE ENGNES OF THE ROTORCRAFT

(71) Applicant: AIRBUS HELICOPTERS, Marignane (FR)

(72) Inventors: Guillaume Dumur, Salon de Provence (FR); Regis Rossotto, Marseilles (FR); Hilario Vieira, Berre L'Etang (FR)

(73) Assignee: AIRBUS HELICOPTERS, Marignane (FR)

( * ) Notice: Subject to any disclaimer, the term of this patent is extended or adjusted under 35 U.S.C. 154(b) by 805 days.

This patent is subject to a terminal disclaimer.

(21) Appl. No.: 15/290,441

(22) Filed: Oct. 11, 2016

(65) Prior Publication Data
US 2017/0025032 A1    Jan. 26, 2017

Related U.S. Application Data

(63) Continuation-in-part of application No. 14/247,459, filed on Apr. 8, 2014.

(30) Foreign Application Priority Data

Apr. 9, 2013    (FR) ..................... 13 00811

(51) Int. Cl.
*G09B 9/08* (2006.01)
*G09B 9/46* (2006.01)
*G09B 9/44* (2006.01)

(52) U.S. Cl.
CPC ............... *G09B 9/46* (2013.01); *G09B 9/085* (2013.01); *G09B 9/44* (2013.01)

(58) Field of Classification Search
CPC .............. G09B 9/46; G09B 9/04; F02C 9/425
(Continued)

(56) References Cited

U.S. PATENT DOCUMENTS 3,930,366 A    1/1976 Nelson
4,831,567 A    5/1989 Lea
(Continued)

OTHER PUBLICATIONS

French Search Report dated Dec. 17, 2013, Application No. FR 1300811, 6 Pages.

*Primary Examiner* — Xuan M Thai
(74) *Attorney, Agent, or Firm* — Brooks Kushman P.C.

(57) ABSTRACT

A method of driving a main rotor of a rotorcraft in rotation while implementing an in-flight simulation mode that simulates failure of one of the engines of the rotorcraft. In simulation mode, and when a current speed of rotation (NR) of the main rotor is detected as being lower than a predetermined threshold speed of rotation (S), the simulation mode is kept active and a regulation command is generated in order to perform a controlled operation (A) of gradually increasing the power delivered by the engines by authorizing the limit imposed by a setpoint (OEI/2) for regulating operation of the engine in simulation mode to be exceeded. Said gradually increasing power is interrupted by the pilot staying under training and operating a collective pitch manoeuver of the blade of the main rotor providing a rotation of main rotor at the predetermined threshold speed in rotation.

18 Claims, 1 Drawing Sheet

(58) Field of Classification Search
USPC .......................................................... 434/33
See application file for complete search history.

(56) References Cited

U.S. PATENT DOCUMENTS

| | | | | |
|---|---|---|---|---|
| 5,363,317 | A * | 11/1994 | Rice | G07C 3/00 |
| | | | | 701/100 |
| 5,873,546 | A * | 2/1999 | Evans | B64C 27/14 |
| | | | | 244/17.13 |
| 5,948,023 | A | 9/1999 | Evans et al. | |
| 6,917,908 | B2 * | 7/2005 | Williams | G09B 9/46 |
| | | | | 244/17.13 |
| 8,666,568 | B2 * | 3/2014 | Camhi | G06F 17/00 |
| | | | | 244/17.11 |
| 2005/0135930 | A1 * | 6/2005 | Certain | B64C 27/57 |
| | | | | 416/30 |
| 2005/0234689 | A1 * | 10/2005 | Gates | G09B 9/46 |
| | | | | 703/8 |
| 2006/0217869 | A1 * | 9/2006 | Horvath | F02C 9/46 |
| | | | | 701/100 |
| 2007/0164167 | A1 * | 7/2007 | Bachelder | G05D 1/102 |
| | | | | 244/220 |
| 2009/0186320 | A1 * | 7/2009 | Rucci | B64C 27/04 |
| | | | | 434/33 |
| 2012/0116613 | A1 * | 5/2012 | Daumas | F02C 9/42 |
| | | | | 701/3 |
| 2015/0176488 | A1 * | 6/2015 | Borchers | F02C 6/02 |
| | | | | 60/773 |

* cited by examiner

METHOD OF DRIVING A MAIN ROTOR OF A ROTORCRAFT IN THE CONTEXT OF SIMULATING A FAILURE OF ONE OF THE ENGNES OF THE ROTORCRAFT

CROSS REFERENCE TO RELATED APPLICATIONS

This application is a continuation-in-part of U.S. application Ser. No. 14/247,459 filed Apr. 8, 2014, which claims priority to French patent application No. FR 13 00811 filed on Apr. 9, 2013, the disclosures of which are incorporated in their entirety by reference herein.

BACKGROUND OF THE INVENTION (1) Filed of the Invention

The present invention relates to the field of simulations performed on board a rotorcraft in order to train a pilot. The present invention relates more particularly to such a simulation relating to training a pilot for the event of a failure of one of the engines of a rotorcraft having a plurality of engines, in particular a twin-engine rotorcraft.

(2) Description of Related Art

Rotorcraft are rotary wing aircraft in which at least lift is obtained by means of at least one main rotor with a substantially vertical axis. Specifically in helicopters, the main rotor provides the rotorcraft not only with lift, but also with propulsion and/or guidance in pitching and in roll. Rotorcraft are also fitted with anti-torque devices providing guidance in yaw, such as at least one auxiliary rotor with an axis that is substantially horizontal. By way of example, such an auxiliary rotor is a tail rotor or a propulsive propeller for a helicopter with high-speed propulsion.

The rotor(s) are driven in rotation by a power plant of the rotorcraft. It is common for such a power plant to comprise at least two engines, gas turbines in particular. The engines are engaged on a power transmission train interposed between the power plant and the members of the rotorcraft that consume mechanical power, in particular the rotor(s).

Typically, operation of the engine members depends on a regulation unit. Regulation of the current operation of engine members is performed by the regulation unit in compliance with a nominal mode of operation commonly referred to as all engines operative (AEO) mode.

The problem of a failure of one of the engines in a power plant needs to be taken into account in the field of aviation. In the event of such a failure, the number of engines available to deliver the required mechanical power to the rotorcraft is reduced.

That is why so-called one engine inoperative (OEI) modes have been established for regulating operation of the engines in the event of one of them failing. In the event of failure of one engine, at least one other available engine operating in OEI mode delivers a setpoint power for a predefined duration, in order to enable the rotorcraft to fly temporarily despite one of the engines being unavailable.

Various OEI modes are usually established for various flight stages of the rotorcraft, such as for example, the following current OEI modes:

OEI mode of very short duration, in which the setpoint power is delivered for a short duration of the order of 30 seconds while the rotorcraft is in a takeoff stage;

OEI mode of short duration, in which the setpoint power is delivered for a short duration of the order of two to three minutes while the rotorcraft is in the advanced stages of takeoff; and OEI mode of long duration, in which the setpoint power is delivered for a potentially unlimited duration.

The ability of engines to deliver the setpoint power on their own in OEI mode implies that they are overdimensioned, depending on the structure of the rotorcraft and on the operating capacities of the engines. It may be observed that it is economically useful to restrict such overdimensioning, the advantage of which is confined to the exceptional event of a failure of one of the engines.

In addition, it may be considered that piloting a rotorcraft in the event of a failure of one of the engines is difficult and requires the pilot to have specific knowledge. That is why there is a need to train pilots for such a failure.

Pilot training is frequently performed by simulation carried out in real flight on board a rotorcraft under the constraints of favorable flying conditions. To this end, a failure of one of the engines is simulated without, however, making the engines inoperative so as to keep all of the engines available and enable any one of them to be used individually in the event of a real failure of another one of them.

In the context of such a simulation, it is preferable to avoid operating an individual engine in compliance with the constraints imposed by the OEI modes. Operation of an engine in OEI mode is damaging to the engine and it is useful to preserve the engine in order to avoid costly maintenance operations. That is why in the context of a said simulation it is common practice to modify the limits imposed by the OEI modes and/or to modify the values of the criteria taken into account in order to define those limits, such as the weight of the rotorcraft.

A training mode referred to as a "single-engine" training mode is known, in which a first engine is used to deliver the setpoint power. At least one second engine is kept in operation and engaged on the power transmission train, but in desynchronized manner such that its use is reserved for maintaining drive of the main rotor to avoid it dropping below a threshold minimum speed of rotation.

If need be, and in particular if the first engine is incapable of delivering the power necessary for driving the main rotor, the second engine is available to deliver power in addition to and/or as a substitute for use of the first engine.

Such an approach is hardly satisfying as regards the speed with which the second engine can be put into use in the event of an emergency, such as in the event of a real failure of the first engine.

The desynchronization of the second engine leads to an unsatisfactory response time for resynchronizing it with the power transmission train, where such synchronization is necessary for driving the main rotor in order to enable the rotorcraft to continue flying under favorable flying conditions. Furthermore and as mentioned above, in order to avoid damage, it is not desirable in the context of a simulation to stress an engine to the limits set by an OEI mode.

Thus, another approach has been proposed in which all of the engines are used simultaneously in order to simulate a failure of one of the engines. In the context of execution of a simulated OEI mode for training purposes, the setpoint power to be delivered is shared evenly between all of the engines, which are kept synchronized with the power transmission train. Under such circumstances, each of the engines delivers mechanical power at a level corresponding to the setpoint power divided by the number of engines.

This other approach presents the advantage of keeping each of the engines in operation and in synchronous engagement with the power transmission train. In the event of a real failure of one of the engines, the reactivity of another engine to delivering all of the power needed is satisfactory. Performing simulation in this way is preferable for preserving the engines and for enabling a pilot to be trained in favorable flying conditions.

In addition, display means indicate the speed of rotation of the main rotor to the pilot so as to enable the pilot to maintain drive to the rotor so as to comply with a setpoint speed of rotation.

In the event of a reduction in the speed of rotation of the main rotor, the pilot varies the collective pitch of the blades of the main rotor so as to reduce the load on the rotor and re-establish rotor drive in compliance with the setpoint speed of rotation.

In order to understand known approaches relating to various in-flight simulations of an engine failure on-board a rotorcraft fitted with a plurality of engines, reference may be made for example to documents US 2005/234689 (PRATT & WHITNEY CANADA), and U.S. Pat. No. 5,873,546 (SIKORSKY AIRCRAFT CORP.). More specifically, relating to delivery of a setpoint power by a plurality of engines together in the context of an in-flight simulation of a failure of one of the engines, reference may be made to documents U.S. Pat. No. 4,831,567 (PRATT & WHITNEY CANADA) and U.S. Pat. No. 6,917,908 (BELL HELICOPTER TEXTRON Inc et al.).

Consideration should also be given to a potential drop in the speed of rotation of the main rotor caused by the inability of the trainee to manage a sudden simulation of a failure of one of the engines or caused under the effect of certain rotorcraft maneuvers performed by the pilot under training. As an indication, it is generally accepted that such a drop in the speed of rotation is of the order of 95% of the setpoint speed of rotation and/or by analogy is of the order of 5% per revolution of the main rotor.

In such flight, a safety device spontaneously interrupts the in-flight simulation, and each of the engines is returned to operating at its nominal power by being regulated in the AEO nominal mode of operation. Reference may also be made to documents US 2009/186320 (RUCCI J. et al.), U.S. Pat. No. 3,930,366 (NELSON R. E.), U.S. Pat. No. 5,948,023 (SIKORSKY AIRCRAFT CORP.), or also to document U.S. Pat. No. 5,873,546 (EVANS C. W. et al.).

However, it is observed that such a solution tends to generate "jolt" phenomena in yaw, thereby making it difficult for the inexperienced trainee to pilot the rotorcraft subjected to such "jolts". It is more particularly observed that interrupting the simulation causes a sudden surge in the mechanical power delivered by the power plant, which tends to destabilize the yaw behavior of the rotorcraft.

The pilot faced with an unexpected interruption of the simulation may be surprised and unable to stabilize the rotorcraft quickly. In addition, the "jolt" phenomenon should be avoided in order to preserve the rotorcraft. It should also be considered that such a situation in which the rotorcraft is destabilized is a consequence of the unrealistic flying behavior induced by the unexpected interruption of the simulation, which goes against the educational purpose of providing a pilot with engine-failure training.

Still concerning educational purpose, it is not appropriate for the trainee to be suddenly confronted with a feeling of failure.

In addition, such a loss of stability of the rotorcraft in yaw depends on values defined by the OEI modes and on the inertia of the tail rotor. Consequently, it is usually necessary to define specific manners of operating the engines in pilot training mode corresponding to the specific structures of rotorcraft in respective families. Consequently, it appears useful to define manners of carrying out the OEI modes in the context of simulating a failure of one of the engines, which manners are suitable for use with rotorcraft of any family.

In conclusion, it appears to be useful to perfect the manners of operating the engines in order to train a pilot for a failure of an engine of a rotorcraft fitted with a plurality of engines, by taking into account as far as possible all of the constraints and requirements and/or advantages as mentioned above.

BRIEF SUMMARY OF THE INVENTION

The present invention provides a method of driving rotation of at least one main rotor of a rotorcraft fitted with a power plant comprising a plurality of engines in the context of implementing an in-flight simulation mode that simulates failure of one of the engines of the rotorcraft, in particular a twin-engined rotorcraft, in order to train a pilot of the rotorcraft for such a failure.

The object of the present invention is to provide such a method in particular taking into account the above-mentioned sought-after requirements and/or advantages, in the context of the above-mentioned technical and economic constraints.

In accordance with the approach of the present invention, it was chosen to implement a method of the type constituting the implementation of an in-flight simulation mode that simulates failure of one of the engines of the rotorcraft in order to train a pilot of the rotorcraft for such a failure.

In accordance with implementing the simulation mode, at least two engines of the power plant of the rotorcraft together deliver power in order to drive the main rotor of said at least one main rotor at a setpoint speed of rotation. Said power is selected to be shared evenly between the engines that are all kept in synchronous engagement on a power transmission train interposed between the power plant and the main rotor.

According to an application of the simulation mode, each of said at least two engines operates on the basis of a first setpoint that is selected from a plurality of predefined first setpoints. Each of said first setpoints is defined according to respective second setpoints, each second setpoint defining a power that the engines are authorized to deliver for a given period when not in simulation mode in the event of a real failure of an engine. Each of the values of the first setpoint corresponds to the second setpoint value from which the first setpoint is defined, being shared evenly between the engines that are used for implementing said simulation mode.

More particularly, and in other words, in such a simulation mode in which the engines are all kept in synchronous engagement on said power transmission train in conventional manner, said at least two engines are each operated on the basis of a first setpoint. Said first setpoint is predefined depending on the value of a second setpoint selected by a trainer from a plurality of second setpoints, each defining a power that the engines would be authorized to deliver for a given period when not in simulation mode and in the event of a real failure of an engine. The value of the first setpoint corresponds to the value of the second setpoint defining it as shared evenly between the engines that are all kept in synchronous engagement on said power transmission train in order to drive rotation of the main rotor in simulation mode.

It should obviously be understood that, outside simulation mode and in the event of a real failure of one of the engines, at least one other engine drives the main rotor in application of the second setpoint.

Still in an application of the simulation mode a current speed of rotation of the main rotor detected as being lower than a predetermined threshold speed of rotation, spontaneously gives rise to an operation being performed whereby the engines deliver additional power within the limit imposed by a third setpoint.

In accordance with such a choice, the present invention more particularly seeks to improve favorable flying conditions of the rotorcraft operating in simulation mode, in particular in response to a destabilization of the rotorcraft in yaw in the event of a fall in the speed of rotation of the main rotor.

The present invention also seeks more particularly to define modes of regulating engines while they are in simulation mode, where such modes are applicable to rotorcraft of a general variety of structures and of various engine capacities.

The present invention seeks still more particularly to improve the educational contribution provided to the pilot during training while using such a simulation.

According to the present invention, such a method is mainly recognized in that said operation of delivering additional power is performed by actively maintaining the simulation mode and by generating a regulation command giving rise to a controlled operation of gradually increasing the power delivered by the engines by authorizing the power limit imposed by the first setpoint to be exceeded. Said gradually increasing power is interrupted by the pilot staying under training and operating a collective pitch manoeuver of the blade of the main rotor providing a rotation of main rotor at the predetermined threshold speed in rotation.

It should obviously be understood that said regulation command is generated by a regulation unit for regulating operation of engine members, in a predefined regulation operation providing predetermined control over the variation of power delivered by the engines between the first setpoint and the third setpoint. Said predetermined control is defined as a function of the variation in power to be delivered in such a manner that the additional power delivered on going from the first setpoint towards the third setpoint is not delivered suddenly until to obtain full power provided by engines with interruption of training, as in the prior art.

It should be recalled that in the prior art, additional power is delivered quickly to go from the first setpoint to the third setpoint of value defined by an AEO mode of operation of the engines for delivering full power to drive the main rotor using a power plant that is not in simulation mode and that is not suffering an engine failure.

In the event of the speed of rotation of the main rotor falling below the predetermined threshold speed of rotation, the gradual increase in power from the engines is just enough to stop the number of revolutions per minute (rpm) of the main rotor from falling, or possibly to promote acceleration of the main rotor. The pilot may continue training under favorable flying conditions, by being assisted by a regulated gradual increase in power, but while controlling the power requirements of the main rotor by causing the blades of the main rotor to perform a collective pitch maneuver.

Said operation of gradually increasing the power delivered by the engines from the first setpoint towards the third setpoint may be advantageously interrupted at a current power level at which the power delivered by the engines drives the main rotor at a speed of rotation that is greater than or equal to the predetermined threshold speed of rotation. The main rotor is advantageously driven at a setpoint speed of rotation that is greater than the predetermined threshold speed of rotation as a consequence of the pilot continuing training in simulation mode and causing the blades of the main rotor to perform a collective pitch maneuver.

It should therefore be understood that said authorized crossing of the first setpoint may potentially be interrupted without the power delivered by the engines necessarily reaching a value corresponding to the third setpoint and/or to a nominal power value of the engines.

The pilot is not suddenly subjected to a feeling of failure, and "jolt" phenomena in yaw are avoided, as occurs in the event of a sudden interruption of the simulation mode because of the speed of rotation of the main rotor being detected as being less than the predetermined threshold speed of rotation.

The proposed manners of avoiding setting the main rotor into rotation at a speed of rotation that is less than the predetermined threshold speed of rotation, are independent of the prior definitions of values for the first setpoint, for the second setpoint, and for the third setpoint, and are independent of the prior definition of the rotorcraft's own weight. The result of this is that the proposed manners are themselves transposable to rotorcraft of any respective structure.

Advantageously, said current power level is maintained after said gradual increase in power has been interrupted.

Such arrangements are in particular useful for simulations operated in the context of a landing procedure or of passing an obstacle so as to maintain flight conditions favorable to pilot training.

More particularly, for any one of said first setpoints implemented in simulation mode, the value of the third setpoint is in particular the value of any one of the second setpoints.

Preferably, for any one of said first setpoints implemented in simulation mode, the value of the third setpoint is the value of the second setpoint defining the value of the first setpoint implemented in simulation mode.

Since, as discussed above, all of the engines are operative in the simulation mode, it should be understood that the third setpoint can be a value higher than the second setpoint. For instance, it should be understood that the third setpoint can be a value of any one of a plurality of all engine operative setpoints.

Said gradual power increase operation is potentially engaged using power variation that is linear.

In a variant, said gradual power increase operation is potentially engaged using variation of the power increased that is gradual. It shall be understood that such a gradual variation is operated using a non-linear function of variation of gradually power increase delivered by the engines.

In an embodiment, said gradual power increase operation is engaged by issuing a first request relating to a gradual increase of the first setpoint until said at least one main rotor reaches a speed of rotation that is not greater than the setpoint speed of rotation.

In another embodiment, said gradual power increase operation is engaged by issuing a second request relating to a predefined speed of rotation for driving the main rotor, the value of the predefined speed of rotation being less than the value of the setpoint speed of rotation and being greater than the value of the predetermined threshold speed of rotation.

These arrangements are such that the gradual nature of the power increase depends on the choice of the value for said predefined speed of rotation, which determines the extra power to be delivered relative to the first setpoint. The predefined speed of rotation is selected in order to request such extra power in a manner suitable for generating said gradual power increase.

In addition, the method preferably includes an operation of displaying a variety of information. The information that is displayed advantageously includes first information relating to the current speed of rotation at which the main rotor is being driven and second information relating to exceeding the value of the first setpoint.

BRIEF DESCRIPTION OF THE SEVERAL VIEWS OF THE DRAWINGS

Embodiments of the present invention are described with reference to the figures of the accompanying sheet, in which.

DETAILED DESCRIPTION OF THE INVENTION

Figure 1:
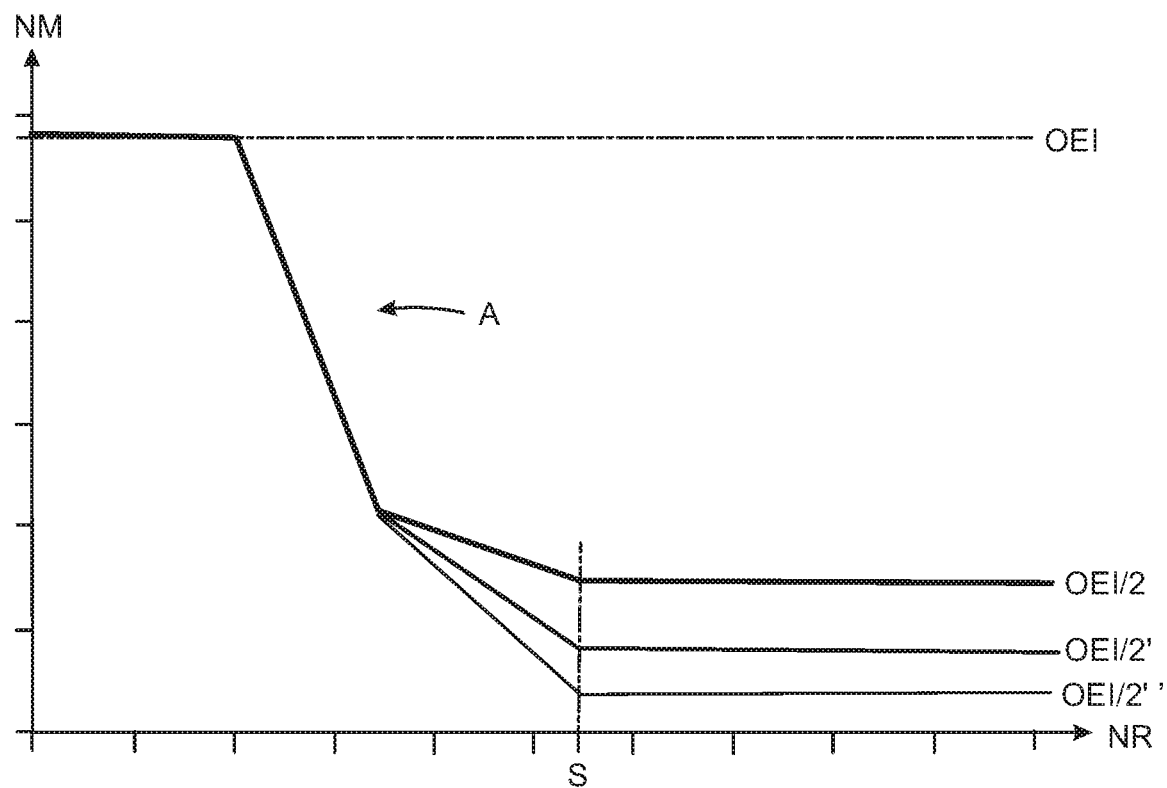
FIG. 1 is a diagram showing the constraints imposed by the application of a simulation mode constituting the implementation of a method of driving rotation of a main rotor of a rotorcraft in an implementation of the present invention.

In the figures, diagrams show manners of operating a rotorcraft engine in order to drive rotation of at least one main rotor of the rotorcraft, in the context of performing an in-flight simulation mode that simulates failure of one of the engines of the rotorcraft.

In the embodiments shown, it is assumed that a rotorcraft has two engines that are used jointly to drive the main rotor. The manners of operating an engine in simulation mode and as shown in the figures, are transposable to any rotorcraft regardless of its structure and the number of engines with which it is fitted.

The engines are jointly in synchronous engagement with a mechanical power transmission train connecting together the engines and the main rotor. Each of the engines of the rotorcraft is suitable for being used individually in the event of a real failure of the other engine in application of the predefined setpoints referred to as second setpoints referred to as OEI setpoints.

Such second setpoints (OEI) relate to the power that each engine is capable of delivering for a given period. In the event of real failure of one of the engines, the other engine is used on its own to drive the main rotor at a given power for a predetermined period, in application of a second setpoint (OEI).

In simulation mode, both engines in operation are kept in synchronous engagement in order to drive the main rotor, in application of a first setpoint, that is common to both engines and that is referred to as an OEI/2 setpoint. The value of such an OEI/2 first setpoint corresponds to the value of the second setpoint (OEI) being shared between the engines that are in use for implementing said simulation mode. In this example of the invention being applied to a twin-engined rotorcraft, the value of such a first setpoint (OEI/2) corresponds to the value of the second setpoint (OEI) divided by the number of engines of the rotorcraft.

For a given first setpoint (OEI/2), the speed of rotation of the main rotor cannot be lower than a predetermined threshold speed of rotation S depending on the torque absorbed by the main rotor. When the main rotor is driven at a current speed of rotation (NR) that is less than or equal to said threshold speed S, a gradual power increase operation A is performed while keeping the simulation mode active.

More particularly, when the current speed of rotation NR of the main rotor is detected as being less than or equal to the predetermined threshold speed of rotation S, a request is issued to engage the gradual power increase operation A that serves at least to maintain the current speed of rotation NR of the main rotor relative to the predetermined threshold speed of rotation S, and possibly gradually increases it.

The gradual power increase operation A is performed individually by each of the engines, in compliance with an authorization to exceed the power limit imposed by the first setpoint (OEI/2). The pilot being trained may continue to pilot the rotorcraft by operating the flight controls for modifying the pitch of the blades of the main rotor, and consequently, for modifying the lift of the rotorcraft until favorable flying conditions are reached.

The gradual power increase operation A is interrupted when the engines together deliver a current power level that is capable of driving the main rotor under favorable flying conditions, at a current speed of rotation NR that is greater than the threshold speed S, depending on the torque absorbed by the main rotor. The current power level delivered by the engines together is preferably maintained after said gradual power increase operation A has been interrupted.

In the figures, the setpoints OEI and OEI/2 are shown at predefined speeds of rotation for driving the main rotor. The second setpoint OEI is shown for a setpoint speed of rotation V1 for driving the main rotor. The first setpoint(s) OEI/2 is (are) shown in the figures at least for a said threshold speed of rotation S.

In FIG. 1, the application of the setpoints OEI and OEI/2 is shown in a graph showing variation of the power delivered by one of the engines of the rotorcraft as a function of the current speed of rotation NR of the main rotor and as a function of the torque NM absorbed by the main rotor.

A plurality of first setpoints OEI/2, OEI/2', and OEI/2" are shown, considering that it is generally accepted that a single first setpoint selected beforehand is taken into consideration in order to regulate the operation of the engine for a given simulation mode as selected by the instructor. The value of each of the first setpoints shown OEI/2, OEI/2', and OEI/2" corresponds to the value of the second setpoint from which each first setpoint is respectively defined and is specific thereto, as is common in the field of rotorcraft.

The gradual power increase operation A is performed when the current speed of rotation NR of the main rotor is detected as being less than or equal to said threshold speed S. A first request is issued to gradually increase the value of the first setpoint OEI/2 until reaching a current speed of rotation NR of the main rotor that is potentially less than but preferably equal to the setpoint speed of rotation V1, depending on the ability of the pilot in training to control variation of the collective pitch of the blades of the main rotor.

As a function of the flight commands issued by the pilot, the gradual power increase operation A is interrupted when the current speed of rotation NR of the main rotor provides favorable lift for the rotorcraft. Such favorable lift is commonly detected by the instrumentation on board the rotorcraft, such as by detecting the variation in the vertical speed of the rotorcraft.

Figure 2:
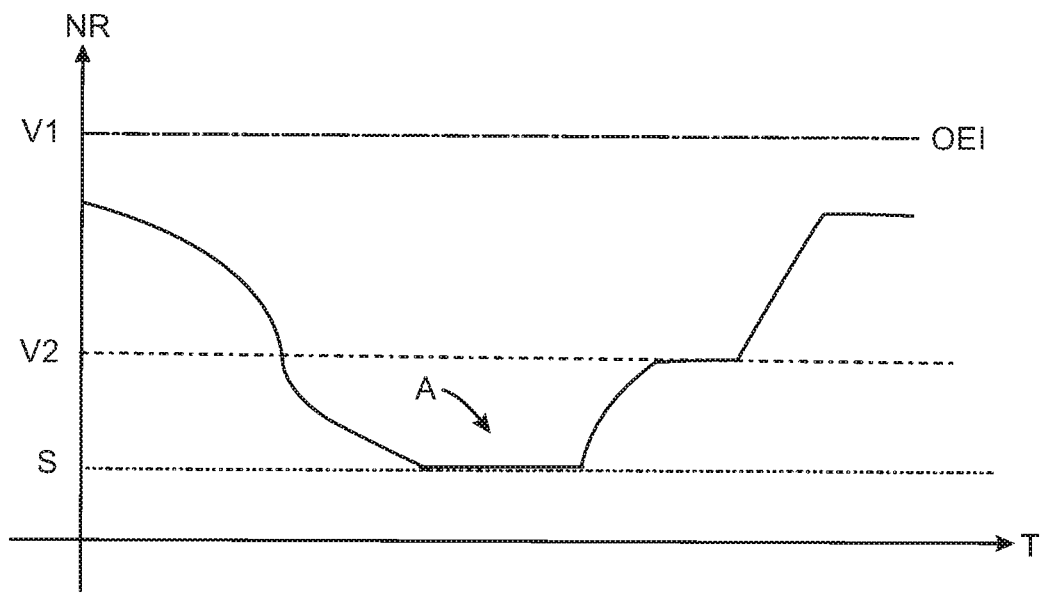
FIG. 2 is a diagram showing the constraints imposed by the application of a simulation mode constituting performing a method of driving rotation of a main rotor of a rotorcraft in another implementation of the present invention.

In FIG. 2, the application of a first setpoint OEI/2 is shown in a graph illustrating variation in the current speed of rotation NR of the main rotor as a function of time T.

The gradual power increase operation A is performed by applying a second request relating to a predefined speed of rotation V2 for driving the main rotor, giving rise to a gradual increase of the current speed of rotation NR of the main rotor.

The gradual power increase operation A is interrupted when the current speed of rotation of the main rotor reaches the predefined speed of rotation V2. The predefined speed of rotation V2 is determined beforehand to be capable of providing favorable lift for the rotorcraft for the main rotor absorbing a level of torque that is identified relative to the value of the first setpoint.

It should be understood that, as a function of the flight commands issued by the pilot, the current speed of rotation NR of the main rotor may increase and may possibly be greater than the predefined speed of rotation V2 relating to the second request.

What is claimed is:

1. A method of driving rotation of at least one main rotor of a rotorcraft fitted with a power plant comprising a plurality of engines, the method implementing an in-flight simulation mode that simulates failure of one of the engines of the rotorcraft in order to train a pilot of the rotorcraft for such a failure, in which simulation mode comprises:
    at least two engines together delivering power in order to drive the main rotor at a setpoint speed of rotation, the power being shared evenly between the engines, that are all kept in synchronous engagement on a power transmission train interposed between the power plant and the main rotor;
    each of the at least two engines operating on the basis of a first setpoint that is predefined depending on a value of a second setpoint selected by a trainer from a plurality of second setpoints, each second setpoint defining a power that the engines are authorized to deliver for a given period when not in simulation mode in the event of a real failure of an engine, the first setpoint value corresponding to the second setpoint value that defines it being shared evenly between the engines that are all kept in synchronous engagement on the power transmission train in order to drive the main rotor in rotation in simulation mode; and
    a current speed of rotation of the main rotor detected as being lower than a predetermined threshold speed of rotation spontaneously gives rise to an operation being performed whereby the engines deliver additional power within a limit imposed by a third setpoint;
    wherein the operation of delivering additional power is performed by actively maintaining the simulation mode and by generating a regulation command giving rise to a controlled operation of gradually increasing the power delivered by the engines by authorizing the limit imposed by the first setpoint to be exceeded, the controlled operation of gradually increasing the power being interrupted at a current power level at which the power delivered by the engines drives the main rotor at a speed of rotation that is greater than or equal to the predetermined threshold speed of rotation as a consequence of the pilot under training in simulation mode causing blades of the main rotor to perform a collective pitch maneuver.

2. A method according to claim 1, wherein, for any one of the first setpoints implemented in simulation mode, a value of the third setpoint is a value of any one of a plurality of all engines operative setpoints.

3. A method according to claim 1, wherein, for any one of the first setpoints implemented in simulation mode, the value of the third setpoint is a value of the second setpoint defining the value of the first setpoint implemented in simulation mode.

4. A method according to claim 1, wherein the current power level is maintained after the controlled operation of gradually increasing the power has been interrupted.

5. A method according to claim 1, wherein the controlled operation of gradually increasing the power is engaged using power variation that is linear.

6. A method according to claim 1, wherein the controlled operation of gradually increasing the power is engaged using variation in the power increase that is gradual.

7. A method according to claim 1, wherein the controlled operation of gradually increasing the power is engaged by issuing a first request relating to a gradual increase of the first setpoint until the at least one main rotor reaches a speed of rotation that is not greater than the setpoint speed of rotation.

8. A method according to claim 1, wherein the controlled operation of gradually increasing the power is engaged by issuing a second request relating to a predefined speed of rotation for driving the main rotor, the value of the predefined speed of rotation being less than the value of the setpoint speed of rotation and being greater than the value of the predetermined threshold speed of rotation.

9. A method according to claim 1, wherein the method includes an operation of displaying at least:
    first information relating to the current speed of rotation at which the main rotor is being driven; and
    second information relating to exceeding the value of the first setpoint.

10. A method according to claim 1, wherein, for any one of the first setpoints implemented in simulation mode, a value of the third setpoint is a value higher than the second setpoint.

11. A method of driving rotation of at least one main rotor of a rotorcraft fitted with a power plant comprising a plurality of engines and implementing an in-flight simulation mode that simulates failure of one of the engines of the rotorcraft in order to train a pilot of the rotorcraft for such a failure, the method comprising:
    operating at least two engines together on the basis of a first setpoint to deliver power to drive the main rotor at a setpoint speed of rotation, the power being shared evenly between the engines, the engines being in synchronous engagement on a power transmission train interposed between the power plant and the main rotor, the first setpoint being predefined and depending on a value of a second setpoint selected by a trainer, the second setpoint defining a power that the engines deliver for a given period when not in simulation mode in the event of a real failure of an engine, the first setpoint value corresponding to the second setpoint value shared evenly between the engines in synchronous engagement on the power transmission train in order to drive the main rotor in rotation in simulation mode; and
    in response to a current speed of rotation of the main rotor becoming lower than a predetermined threshold speed of rotation, a regulation command is generated to operate the engines to deliver additional power within a limit imposed by a third setpoint, wherein the operation of delivering additional power is performed while maintaining the simulation mode, the regulation command gradually increasing the power delivered by the engines by authorizing the limit imposed by the first setpoint to be exceeded, and the operation of gradually increasing the power being interrupted at a current power level at which the power delivered by the engines drives the main rotor at a speed of rotation that is greater than or equal to the predetermined threshold speed of rotation as a consequence of the pilot under training in simulation mode causing blades of the main rotor to perform a collective pitch maneuver.

12. A method according to claim 11, wherein, for any one of the first setpoints implemented in simulation mode, a value of the third setpoint is a value of any one of a plurality of all engines operative setpoints.

13. A method according to claim 11, wherein, for any one of the first setpoints implemented in simulation mode, the value of the third setpoint is a value of the second setpoint defining the value of the first setpoint implemented in simulation mode.

14. A method according to claim 11, wherein, for the first setpoint implemented in the simulation mode, the value of the third setpoint is a value of the second setpoint defining the value of the first setpoint implemented in simulation mode.

15. A method according to claim 11, wherein the operation of gradually increasing the power is engaged by issuing a first request relating to a gradual increase of the first setpoint until the at least one main rotor reaches a speed of rotation that is not greater than the setpoint speed of rotation.

16. A method according to claim 11, wherein the operation of gradually increasing the power is engaged using power variation that is linear.

17. A method according to claim 11, wherein the operation of gradually increasing the power is engaged using variation in the power increase that is gradual.

18. A method according to claim 11, wherein the method includes an operation of displaying at least:
first information relating to the current speed of rotation at which the main rotor is being driven; and
second information relating to exceeding the value of the first setpoint.

* * * * *